(12) United States Patent
Harding

(10) Patent No.: US 7,761,105 B2
(45) Date of Patent: Jul. 20, 2010

(54) MANAGING TEXT MESSAGE TRAFFIC IN MOBILE TELEPHONE NETWORKS

(75) Inventor: Robert Harding, Hampshire (GB)

(73) Assignee: Solent Text Limited, Fareham, Hampshire (GB)

( * ) Notice: Subject to any disclaimer, the term of this patent is extended or adjusted under 35 U.S.C. 154(b) by 0 days.

(21) Appl. No.: 10/474,658

(22) PCT Filed: Apr. 15, 2002

(86) PCT No.: PCT/GB02/01724

§ 371 (c)(1),
(2), (4) Date: Apr. 14, 2004

(87) PCT Pub. No.: WO02/085052

PCT Pub. Date: Oct. 24, 2002

(65) Prior Publication Data

US 2004/0171393 A1  Sep. 2, 2004

(30) Foreign Application Priority Data

Apr. 18, 2001  (GB) .................................. 0109525.6

(51) Int. Cl.
*H04W 4/00* (2009.01)
*H04W 40/00* (2009.01)
*H04M 1/725* (2006.01)
*H04Q 11/00* (2006.01)
*H04L 12/28* (2006.01)
*H04L 12/54* (2006.01)

(52) U.S. Cl. .................. 455/466; 455/412.1; 455/445; 370/386; 370/389; 370/428

(58) Field of Classification Search .................. 455/466, 455/412.1, 445; 370/386, 389, 428
See application file for complete search history.

(56) References Cited

U.S. PATENT DOCUMENTS 5,711,011 A * 1/1998 Urs et al. ..................... 455/520
5,787,357 A * 7/1998 Salin .......................... 455/466

(Continued)

FOREIGN PATENT DOCUMENTS

EP  1 380 183  4/2002

(Continued)

OTHER PUBLICATIONS http://www.telsis.co.uk/0008_4.htm, "Telsis Applications: Internet Traffic Grooming" Published.on Mar. 3, 2001.

(Continued)

*Primary Examiner*—Vincent P Harper
*Assistant Examiner*—Ariel Balaoing
(74) *Attorney, Agent, or Firm*—Renner, Otto, Boisselle and Sklar, LLP

(57) ABSTRACT

A grooming technique for managing text message traffic in mobile telephone networks, such as SMS text messages, involves directing certain text messages to a first delivery means (30) which attempts text message delivery one or more times to a destination mobile switching centre (22) or to a host (24) without passing through a store and forward function. Other text messages are directed to a second delivery means, involving a short message service centre (14), which provides a store and forward function for repeated attempted delivery of the text messages.

13 Claims, 1 Drawing Sheet

U.S. PATENT DOCUMENTS

Figure 1:
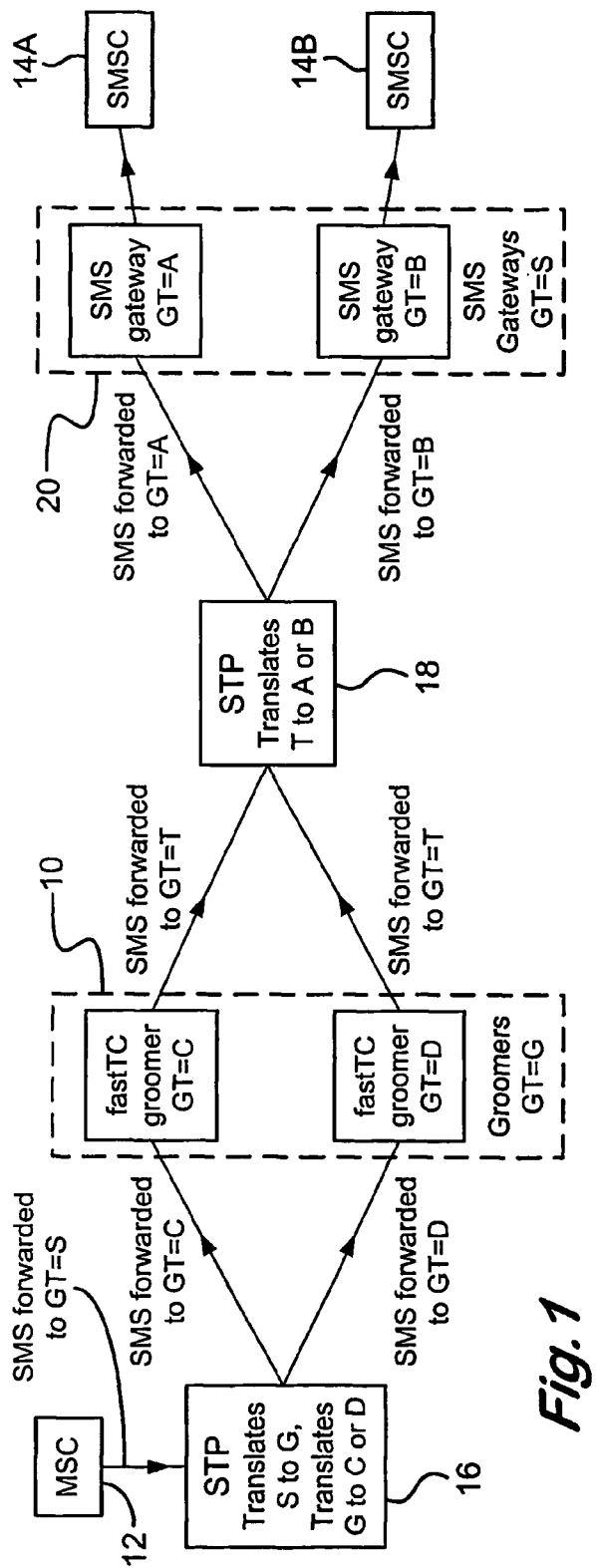

| | | | | |
|---|---|---|---|---|
| 5,806,000 | A * | 9/1998 | Vo et al. | 455/466 |
| 5,822,700 | A * | 10/1998 | Hult et al. | 455/466 |
| 5,946,630 | A | 8/1999 | Willars et al. | |
| 6,108,530 | A * | 8/2000 | Ayabe et al. | 455/403 |
| 6,154,646 | A * | 11/2000 | Tran et al. | 455/417 |
| 6,442,159 | B2 * | 8/2002 | Josse et al. | 370/354 |
| 6,459,904 | B1 * | 10/2002 | Lorello et al. | 455/466 |
| 6,507,589 | B1 * | 1/2003 | Ramasubramani et al. | 370/465 |
| 6,512,926 | B1 * | 1/2003 | Henry-Labordere | 455/445 |
| 2001/0039191 | A1 * | 11/2001 | Maierhofer | 455/466 |
| 2002/0159387 | A1 * | 10/2002 | Allison et al. | 370/229 |
| 2002/0194331 | A1 * | 12/2002 | Lewis et al. | 709/224 |
| 2004/0156495 | A1 * | 8/2004 | Chava et al. | 379/392 |

FOREIGN PATENT DOCUMENTS

| | | |
|---|---|---|
| GB | 2 353 190 | 2/2001 |
| GB | 2 354 135 | 3/2001 |
| GB | 2 377 861 | 1/2003 |
| WO | 98/32300 | 7/1998 |
| WO | 98/56195 | 12/1998 |
| WO | 99/49680 | 9/1999 |
| WO | 00/47004 | 8/2000 |

OTHER PUBLICATIONS

European Telecommunication Standard, Digital Cellular Telecommunications System (Phase 2+); Technical Realisation of the Short Message Service (SMS); Point-to-Point, GSM 03.40 Version 5.4.1, European Telecommunications Standards Institute. Published Apr. 1997.

http://www.pt.com/press/release01_segway_02_12_01.html, "Performance Technologies Introduces Low Cost IP Network Alternative to Dedicated SS7 Links." Published Feb. 12, 2001. Also document hyperlinked in Press release entitled "The SEGway Edge."

http://www.lucent.com/press/0100/000104.nsb.html, "TeleCorp PCS, Lucent Technologies, Telecommunication Systems and Nokia successfully complete first two-way short message service (SMS) and wireless Internet application trial on TDMA network." Published Jan. 4, 2000.

"The Convergence of Wireless, SS7 and IP" presented to the "Voice on the Net Spring 2001" conference on Mar. 21, 2001 by Reg Cable, VP Signaling Systems Group, Performance Technologies.

"Next Generation Solutions for SS7/IP Interworking" presented to the "In Forum—Tec Forum (TF5) Session: Signaling for Next Generation Networks" conference on Feb. 15, 2001 by Robert Mason, Director—Marketing Signaling System Group, Performance Technologies.

http://www.telsis.co.uk/0073.htm, "Ocean fastTC Transaction Converter" Published Dec. 4, 2000.

Peersman et al. "The Global System for Mobile Communications Short Message Service." IEEE Personal Communications. Published Jun. 2000.

www.MediaGuardian.co.uk "Message in a bottleneck." Published Jan. 1, 2002.

Van Dusseldorp & Partners, European Internet Strategings. "SMS-TV: Interactive Television Reinvented." Published Sep. 2002.

European Opposition to EP 1380183.

* cited by examiner

MANAGING TEXT MESSAGE TRAFFIC IN MOBILE TELEPHONE NETWORKS

This application is a national phase of International Application No. PCT/GB02/01724 filed Apr. 15, 2002 and published in the English language.

This invention relates to managing text message traffic in mobile telephone networks and, in particular but not exclusively, to improvements in the capacity and utilisation of mobile telephone networks for sending messages.

In the Global System for Mobile Communication (GSM), the short message service (SMS) allows mobile stations (MS) and hosts to send and receive short text messages. The messages are routed via a short message service centre (SMSC) which provides a store and forward function. The SMSC will attempt to deliver the message to its destination, which may be an MS or a host address in the same or another network.

The store and forward nature of the service has both advantages and disadvantages. Although the delivery of a message is facilitated by the ability of the SMSC to retry delivery at intervals within a user-specified validity period, and to retry immediately when the network notifies the SMSC that an unavailable MS has just become available, the storage feature takes considerable resources within the SMSC. Consequently SMSCs are expensive items of equipment. Estimates from some networks indicate that only 30% of SMS traffic is delivered on the first try, which can result in long backlogs during periods of high usage. At the same time, SMS usage is growing exponentially in many networks, and both the storage resources and the peak traffic rates are becoming bottlenecks for some operators. One way to resolve this situation is for operators to install and commission more SMSC capacity. This invention aims to provide a cost effective alternative which can allow operators to make better use of their existing SMSC capacity.

According to one aspect of the invention there is provided a method of managing text message traffic in a telecommunications services apparatus for processing text messages in a mobile telephone network, the method comprising directing certain text messages to a first delivery means operable to attempt text message delivery without passing through a store and forward function, and directing other text messages to a second delivery means providing a store and forward function for repeated attempted delivery of the text messages, wherein the text messages are directed selectively to either said first or said second delivery means dependent on specific attributes of the text messages.

According to another aspect of the invention there is provided text message management apparatus for managing text message traffic in a telecommunications services apparatus for processing text messages in a mobile telephone network, the text message management apparatus comprising first means for directing certain text messages to a first delivery means operable to attempt text message delivery without passing through a store and forward function, and second means for directing other text messages to a second delivery means providing a store and forward function for repeated attempted delivery of the text message, wherein the text messages are directed selectively to either said first or said second delivery means dependent on specific attributes of the text messages.

The first delivery means may be operable selectively to attempt text message delivery directly to a destination mobile switching centre or to a destination text message host.

Embodiments of the invention reduce the loading on the SMSCs by the deployment of some relatively inexpensive equipment in the network. This equipment will be referred to as 'SMS Groomer' equipment. The equipment grooms the SMS traffic in order to separate it into— traffic which can be delivered immediately to its destination
 traffic which must be passed to the SMSC for store and forward The SMS Groomer provides SMS delivery without the storage function. For a message which is delivered immediately it behaves, as far as the rest of the network is concerned, in the same way as an SMSC. It interfaces to billing systems and to home location registers (HLRs) in the same way, and handles delivery and status reports in the same way. However for messages which cannot be delivered on the first attempt, it simply passes the messages transparently to and from the SMSC.

It is not necessary for all network SMS traffic to pass through SMS Groomers. A network may choose to groom as little or as much of its SMS traffic as required. Benefit will only be gained for the traffic which is groomed, but the scalability of the solution allows the concept to be trialled in a small way before a full network roll out is contemplated.

The preferred system acts as a traffic groomer, separating traffic which can be delivered first time from traffic which possibly cannot. This provides direct benefits for the SMSC capacity required, since the percentage of messages which are delivered immediately is now removed from the SMSC loading. The existing SMSC installed base can therefore be used more effectively for doing the job for which it was designed, namely store and forward. SMS traffic can continue to grow significantly further before additional SMSC capacity will be required, which can result in a considerable cost saving. The grooming equipment required to achieve this is relatively inexpensive.

Once grooming equipment is in place, it can also be used to groom other types of traffic, for example—

Televoting. SMS voting is a highly desirable technology for many operators, but in many cases their SMSC capacity would not cope with the very high peak message rates that TV or Radio induced voting can cause. By grooming off the voting traffic before it reaches the SMSC, the load from its own network customers can be prevented from loading its SMSCs. Voting traffic could either be diverted transparently to another equipment in SMS form, or could be converted by the groomer to another protocol such as TCP/IP for transmission to vote counting equipment.
 High volume messages from third party hosts to closed user groups or mailing lists. Interfaces to SMSCs are often provided to hosts over which they can send and receive SMS messages. These channels are used to communicate with the host's customers, for example subscribers to a football information service might all wish to receive notification about goals scored in a match as soon as possible after the event. Store and forward is inappropriate for this, as the information has only a very short useful lifetime. The groomers can be used to attempt immediate delivery of these types of messages but not to pass them on to an SMSC in the event of delivery failure. This scheme may be known as 'fire and forget.' Depending on the particular service offered, hosts may wish to make use of fire and forget, or store and forward messaging to their customers.

Figure 2:
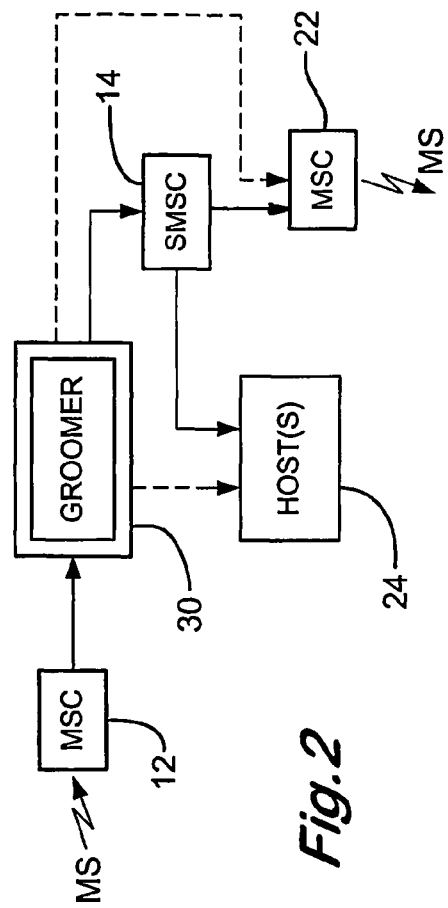

The invention will now be described by way of example with reference to the accompanying drawings, in which:

FIG. 1 shows Signalling Transfer Point (STP) routing of short messages through grooming equipment in one embodiment of the invention; and FIG. 2 shows grooming equipment within an SMS delivery system for a mobile network.

Networks which have more than one physical SMSC will normally perform load sharing between them by utilising the capabilities of the signalling network. This is normally done by assigning a collective or 'Service' Global Title to the group of SMSCs, and then using the Signalling Transfer Points (STPs) in the network to translate these addresses to specific Global Titles referring to preferred or secondary physical SMS gateways, which are the devices which provide the connection between the network and the SMSCs. The load sharing algorithm is implemented by this translation process, and is normally geographical to minimise signalling capacity usage across the network. If an SMS gateway equipment becomes unreachable for any reason, then the STPs will use an alternative automatically. This mechanism provides inherent scalability in the network.

The same mechanism can be used to provide access to SMS grooming equipment as shown in FIG. 1. One or more SMS groomers 10 are deployed in the network with a Service Global Title 'G'. Mobile Switching Centres (MSCs) 12 always deliver mobile originated SMS messages to the Service Global Title 'S' for SMSCs 14A, 14B. The STPs 16 are normally set up to forward traffic with destination 'S' to specific SMSC equipments according to an SMSC load sharing algorithm. However as more groomers are rolled out in the network, the STP translations of 'S' are gradually cut over to point to the groomer equipment Service Global Title 'G' instead of to SMSC equipments. STPs 16 are programmed to translate 'G' into a specific groomer equipment address according to a groomer load sharing algorithm. The groomer 10 attempts to deliver SMS traffic directly to destination MSCs, but forwards those messages which cannot be delivered immediately to a new Service Global Title 'T' for the SMSCs 14A, 14B. The STPs 18 are set up to forward traffic with destination 'T' to specific SMSC equipments according to the SMSC load sharing algorithm.

The indirection mechanism used here allows for controlled roll out of a new service, and for test traffic to be directed to specific equipments prior to their inclusion in a live load sharing arrangement. The number of SMS groomers 10 required depends only on the traffic capacity to be groomed, and is independent of the number of SMS gateways 20 in the network.

The preferred embodiment of this invention uses a Telsis (RTM) fastTC (transaction converter), manufactured by Telsis Limited, as the groomer 10. The fastTC is a high performance transaction convertor which can connect via both the SS7 protocol and the TCP/IP data protocol. For the grooming application the fastTC receives and filters SMS messages according to programmable criteria. The fastTC can filter on originating or destination address, or on the SMS payload contents, or on any combination of these attributes, but in this case the application will attempt an SMS message delivery directly to the destination MSC. If the delivery was successful, the fastTC will acknowledge receipt of the message, and also send a status report if requested by the sender, and perform the necessary billing record generation. For fire and forget applications this is all that will happen, but for store and forward applications if the delivery was unsuccessful, the fastTC will forward the message to an SMSC, and transparently pass the SMSC responses back to the sender. A schematic diagram of the fastTC used as an SMS groomer is shown in FIG. 1.

FIG. 2 shows how the grooming equipment may be incorporated in an SMS delivery system for a mobile network.

Referring to FIG. 2, in conventional manner, an MSC 12 receives mobile signals from mobile stations (MS), and forwards SMS signals for delivery to an SMSC 14. The SMSC 14 sends the SMS signals to the appropriate MSC 22 for attempted delivery to the required mobile station (MS). As discussed above, in the event of non-delivery of an SMS signal, the SMSC 14 will retry delivery at intervals within a user-specified delivery period, or will retry when notified that an unavailable MS has just become available. As an alternative to delivery to the MSC 22, the SMSC 14 may attempt transmission to a host 24.

In accordance with an embodiment of the invention, FIG. 2 also shows a groomer 30 (which is preferably as described above) between the MSC 12 and the SMSC 14. As previously discussed, selected SMS signals may by-pass the SMSC 14 for direct delivery (via the dashed lines) to the MSC 22 or the host 24. Another configuration of groomer (not shown) could provide direct message delivery from the host 24 to the MSC 22.

The invention claimed is:

1. A method of managing text message traffic in a telecommunications services apparatus for processing SMS text messages in a mobile telephone network, the method comprising
    directing certain SMS text messages to a first delivery means operable to attempt text message delivery without passing through a short message service centre, and
    directing other SMS text messages to a second delivery means providing a store and forward function for repeated attempted delivery of the SMS text messages,
    wherein the SMS text messages are directed selectively to either said first or said second delivery means dependent on specific attributes of the SMS text messages, wherein the second delivery means includes a short message service centre, and wherein a SMS text message is initially directed to said first delivery means and, if the delivery attempt is unsuccessful, or the delivery attempts are unsuccessful, the undelivered SMS text message is then directed to the second delivery means for attempted delivery.

2. A method according to claim 1, wherein the first delivery means is operable selectively to attempt text message delivery directly to a destination mobile switching centre.

3. A method according to claim 1, wherein the first delivery means is operable selectively to attempt text message delivery to a destination text message host.

4. A method according to claim 1, wherein the text message attribute that determines whether the SMS text message is selectively directed to either said first or said second delivery means is the originating address of the SMS text message.

5. A method according to claim 1, wherein the text message attribute that determines whether the SMS text message is selectively directed to either said first or said second delivery means is the destination address of the SMS text message.

6. A method according to claim 1, wherein the text message attribute that determines whether the SMS text message is selectively directed to either said first or said second delivery means path is contained within the content of the SMS text message.

7. A method according to claim 1, wherein the text message attribute that determines whether the SMS text message is selectively directed to either said first or said second delivery means is any combination of the originating address, the destination address and the message content.

8. A method according to claim 1, wherein the first delivery means comprises a transaction converter.

9. Text message management apparatus for managing text message traffic in a telecommunications services apparatus for processing SMS text messages in a mobile telephone network, the text message management apparatus comprising:

first means for directing certain SMS text messages to a first delivery means operable to attempt text message delivery without passing through a short message service centre, and second means for directing other SMS text messages to a second delivery means providing a store and forward function for repeated attempted delivery of the SMS text messages, wherein the SMS text messages are directed selectively to either said first or said second delivery means dependent on specific attributes of the SMS text messages, wherein the second delivery means includes a short message service centre, and wherein a SMS text message is initially directed to said first delivery means and, if the delivery attempt is unsuccessful, or the delivery attempts are unsuccessful, the undelivered SMS text message is then directed to the second delivery means for attempted delivery.

10. Apparatus according to claim 9, wherein the first delivery means is operable selectively to attempt text message delivery directly to a destination mobile switching centre.

11. Apparatus according to claim 9, wherein the first delivery means is operable selectively to attempt text message delivery to a destination text message host.

12. A method according to claim 1, wherein the certain SMS text messages are mobile originating format text messages that have been forwarded from a switching centre of the network to the first delivery means, and the other SMS text messages are mobile originating format text messages forwarded from the switching centre of the network to the second delivery means.

13. Apparatus according to claim 9, wherein the certain SMS text messages are mobile originating format text messages that have been forwarded from a switching centre of the network to the first delivery means, and the other SMS text messages are mobile originating format text messages forwarded from the switching centre of the network to the second delivery means.

* * * * *